Jan. 21, 1930.  E. V. MOTT ET AL  1,744,566
GROUND RESISTANCE TEST SET
Filed Sept. 11, 1924   4 Sheets-Sheet 1

INVENTORS
E. V. Mott
L. H. Rovere
D. H. Rowland
BY Eugene C. Brown
ATTORNEY

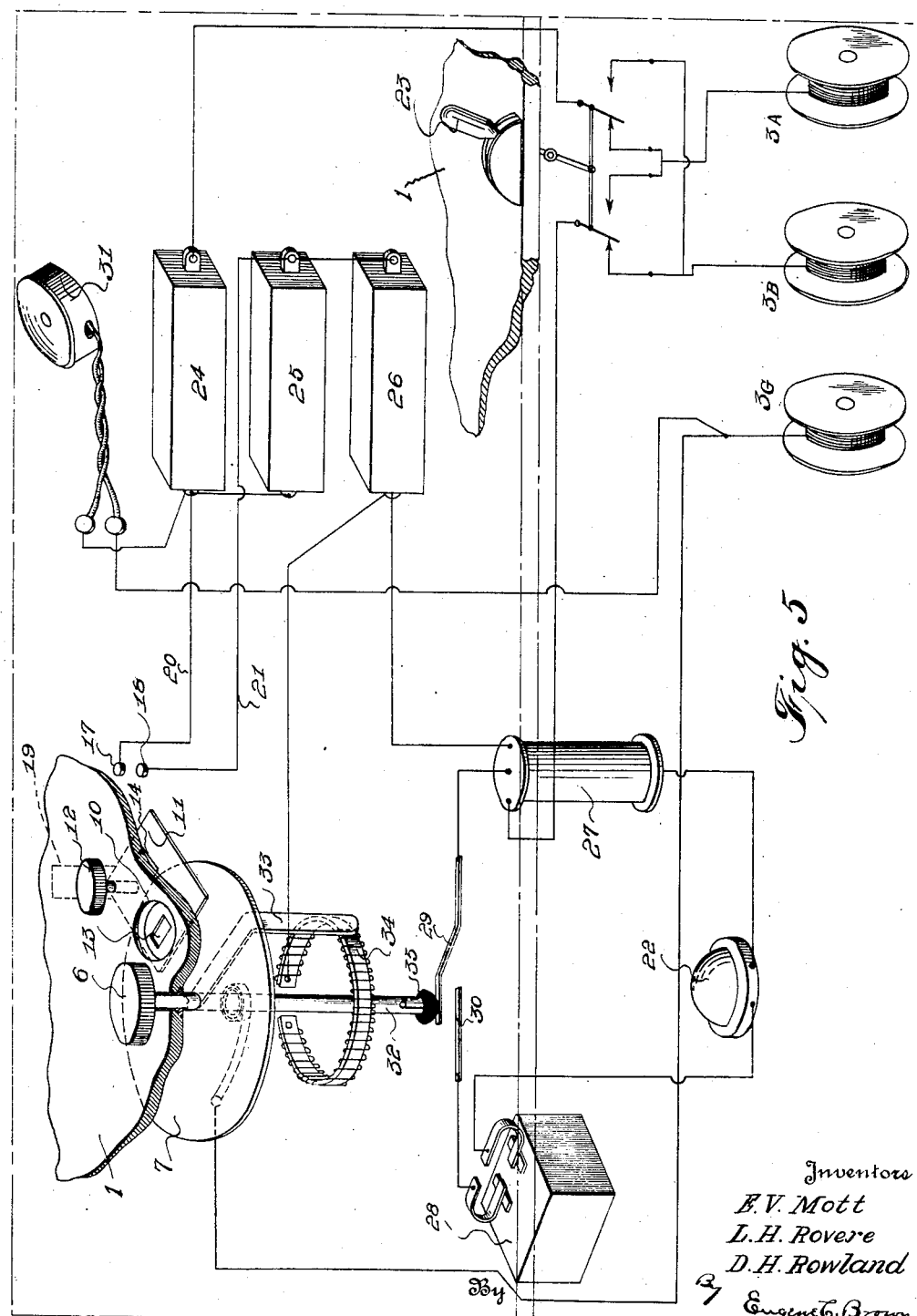

Patented Jan. 21, 1930

1,744,566

UNITED STATES PATENT OFFICE

EVERETT V. MOTT, OF QUEENS, AND LEWIS H. ROVERE, OF RICHMOND, NEW YORK, AND DAVIDGE H. ROWLAND, OF BALTIMORE, MARYLAND, ASSIGNORS TO THE WESTERN UNION TELEGRAPH COMPANY, OF NEW YORK, N. Y., A CORPORATION OF NEW YORK

GROUND-RESISTANCE TEST SET

Application filed September 11, 1924. Serial No. 737,200.

In the construction and operation of nearly all electrical systems, earth or ground connections are frequently required. In many cases the value of such ground connections will depend greatly upon the resistance of the ground connections being at all times within certain limits. It is therefore necessary to measure at least once and in many cases periodically the resistance of nearly all grounds.

The object of our invention is to facilitate the measuring of ground resistance by providing a portable test set for the measurement of the resistance of ground connections by a high resistance bridge method.

The portable set of our invention provides all the apparatus and wires necessary for measuring the resistance, although it is, of course, necessary that auxiliary grounds be available. The set provides the wires to connect the apparatus to the grounds, the parts constituting the high resistance bridge, a source of alternating current, a telephone receiver, and a device which, when the bridge is balanced, gives a direct visual indication of the resistance of the ground under test.

Certain details of construction of the set offer particular advantages which will be disclosed in detail in the description following. Among these novel features of construction may be noted the wire reels, which provide flexible connection to the grounds, and the indicating device which is calibrated for two different ranges, either one of which is disclosed depending on the particular position of a shutter, and is provided with automatic circuit changing means to vary the ratio of the bridge arms to suit the range disclosed by the shutter window when in that particular position.

The invention also provides means under control of the rotatable shaft of a rheostat to close the circuit of a battery supplying current to the rheostat, prior to rotation of the shaft for varying the rheostat resistance.

The details of construction of the portable set, together with the method of using the set and its principle of operation, will appear from the following description taken with the accompanying drawings in which:

Fig. 5 is a perspective view of the set with the casing 1 broken away to show the various elements of the set.

Figure 2:
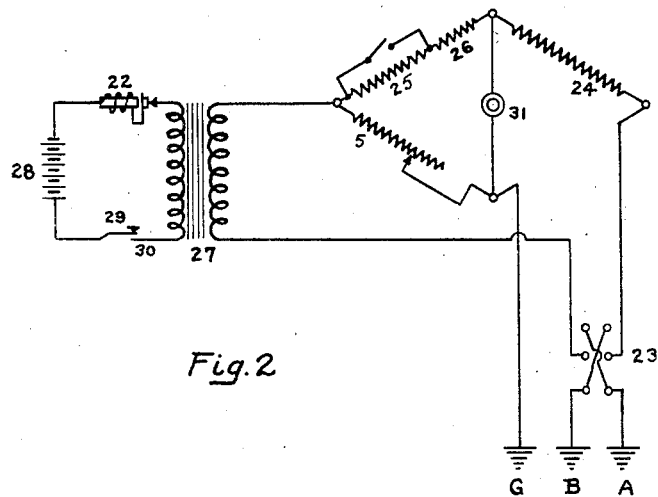
Fig. 2 is a simplified wiring diagram of the set, showing the circuit used in carrying out the high resistance bridge method of measuring ground resistance.

The circuit connections for carrying out the high resistance bridge method will appear upon examination of Fig. 2. The elements of the high resistance bridge shown in Fig. 2 are numbered as are the same elements in Fig. 4 so that it will be clear that Fig. 2 is a simplified diagram of the circuit connections of the set of our invention.

The connections includes a source of alternating current, shown as comprising a battery 28, buzzer 22, and induction coil 27, connected in one diagonal of a balanced bridge arrangement, the four arms of which are made up of (1) a series arrangement of a fixed, high resistance 24 and an auxiliary ground A, (2) a variable rheostat 5, (3) another high resistance (here shown as made up of two resistance units 25 and 26, one of which may be short-circuited for a purpose explained below), and (4) the ground connection G under test. The source of current is connected at one terminal to the junction of the variable rheostat 5 and resistance 25. The balance indicating instrument 31 is connected across the remote terminals of the elements 5 and 26. The second terminal of the source of testing current is connected to auxiliary ground B. The second terminal of the rheostat is connected to the ground under test, and the other auxiliary ground, A, is connected in a bridge arm to a terminal of fixed resistance 24. A reversing switch 23 is interposed in the auxiliary ground connections so that the grounds A and B may be interchanged.

The theory of operation of the high resistance bridge, which is explained fully in the application of J. W. Milnor, Serial No. 98,047, filed March 27, 1926, is, briefly, as follows: The resistance of the bridge arms is made so high that the resistance of the auxiliary grounds is very small by comparison. Thus the arm of the bridge, comprising the series arrangement of high resistance 24 and auxiliary ground A may be assumed to have the resistance of the high resistance 24, the resistance of ground A being negligible. If resistance 24 and the combined resistance of 25 and 26 are both equal to 5000 ohms, for example, then under conditions of bridge balance, the resistance of rheostat 5, which may be of the order of 50 ohms, and the resistance of the ground under test will be substantially equal, and the rheostat reading will give a direct indication of the resistance of the ground under test. If the ground under test has an exceptionally high resistance the bridge is used with resistance 25 short-circuited. In this case, the ratio arm comprising resistance 24 will be ten times as great as the ratio arm comprising resistance 26; accordingly, the ground under test will have ten times as great a resistance as the variable rheostat under conditions of balance.

It is one of the features of our invention that the dial of rheostat 5 is provided with two sets of readings, so that the resistance of the ground under test may be read directly from the rheostat dial whether the ratio arms are equal, or are multiples, one of the other.

Figure 1:
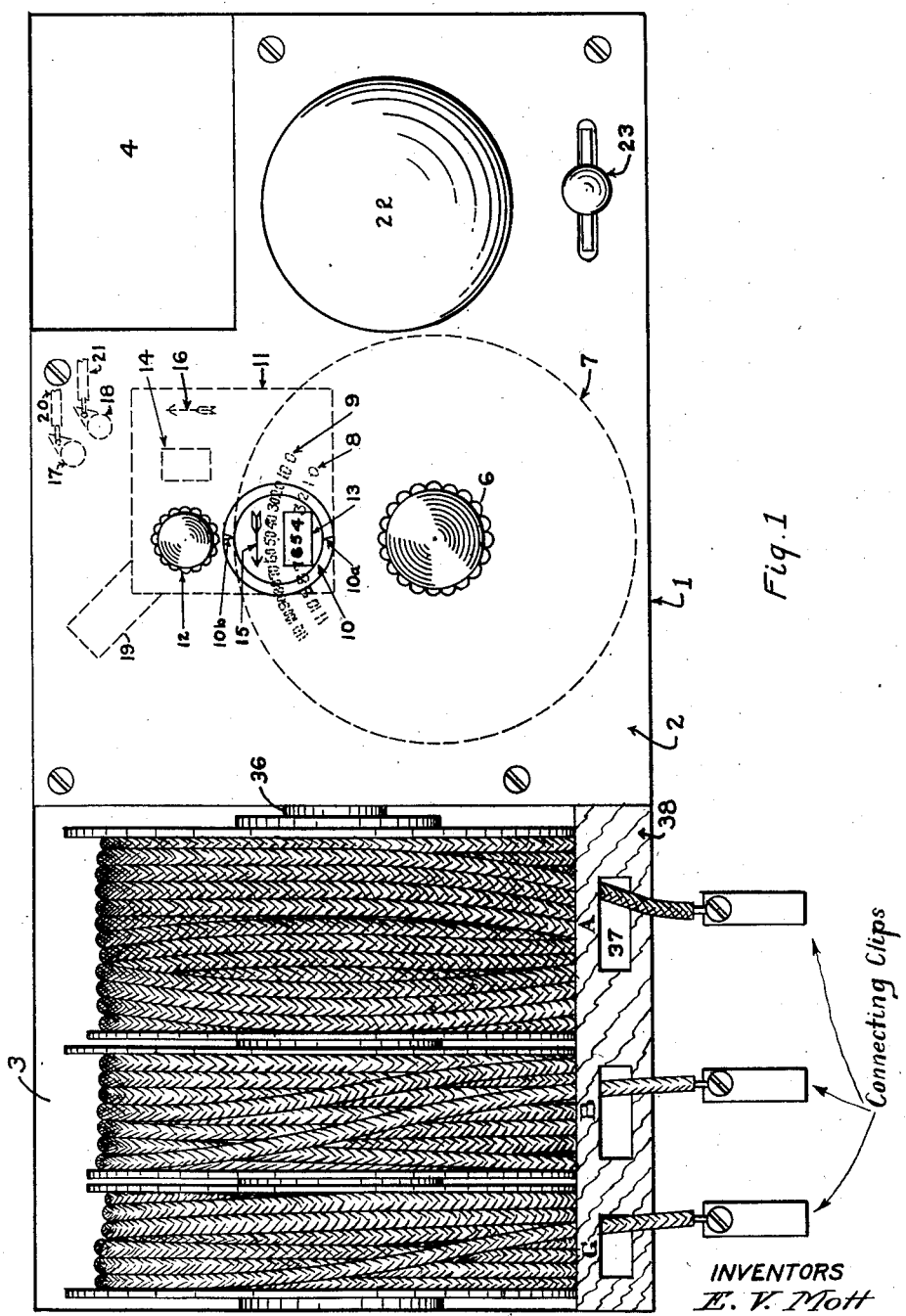
Fig. 1 is a plan view of the general assembly of the set.

By reference to Fig. 1, it may be seen that the complete set consists of a box 1, one portion of which is occupied by a panel 2 and its associated instruments, while the rest of the box is formed in two compartments, 3 and 4, of which 3 houses three reels $3_A$, $3_B$, and $3_G$, and 4 is a well for holding the test telephones.

The apparatus associated with the panel forms the test unit proper, the wire reels providing novel and convenient means for making connections from the ground under test and auxiliary grounds to the elements of the high resistance bridge.

The apparatus at the rear of panel 2 includes rheostat 5 the knob 6 of which projects through the panel to the front of the box. A dial 7, which is marked in two sets of graduations 8 and 9, lies below the panel, the graduations being visible through an opening 10 in the panel. The indices points are shown at $10_a$, and $10_b$.

A shutter device 11 is arranged back of the panel, overlying dial 7, and is provided with a knob 12 projecting through the front of the panel, by means of which the shutter device may be rotated a quarter turn to bring either of its openings, 13 and 14, into registration with opening 10 in the panel. The arrows 15 and 16 upon the shutter indicate the direction in which the knob 12 is to be rotated. Mounted on the shutter device is a switch arm 19 which bridges terminals 17 and 18 when the device is rotated so that openings 14 and 10 register. Conductors 20 and 21 lead to resistance unit 25 but are normally unconnected; however, upon movement of the switch arm to bridge terminals 17 and 18, this resistance unit is short-circuited, for a purpose to be explained in detail later on.

The buzzer 22 is also mounted on the panel, and below it the handle of a reversing switch 23 projects to the front of the box through a slot in the panel. The rest of the apparatus (see Fig. 4) enclosed in the box includes resistance units 24, 25, and 26, an induction coil 27, a battery 28, battery switch including contacts 29 and 30, and test telephone 31.

Figure 4:
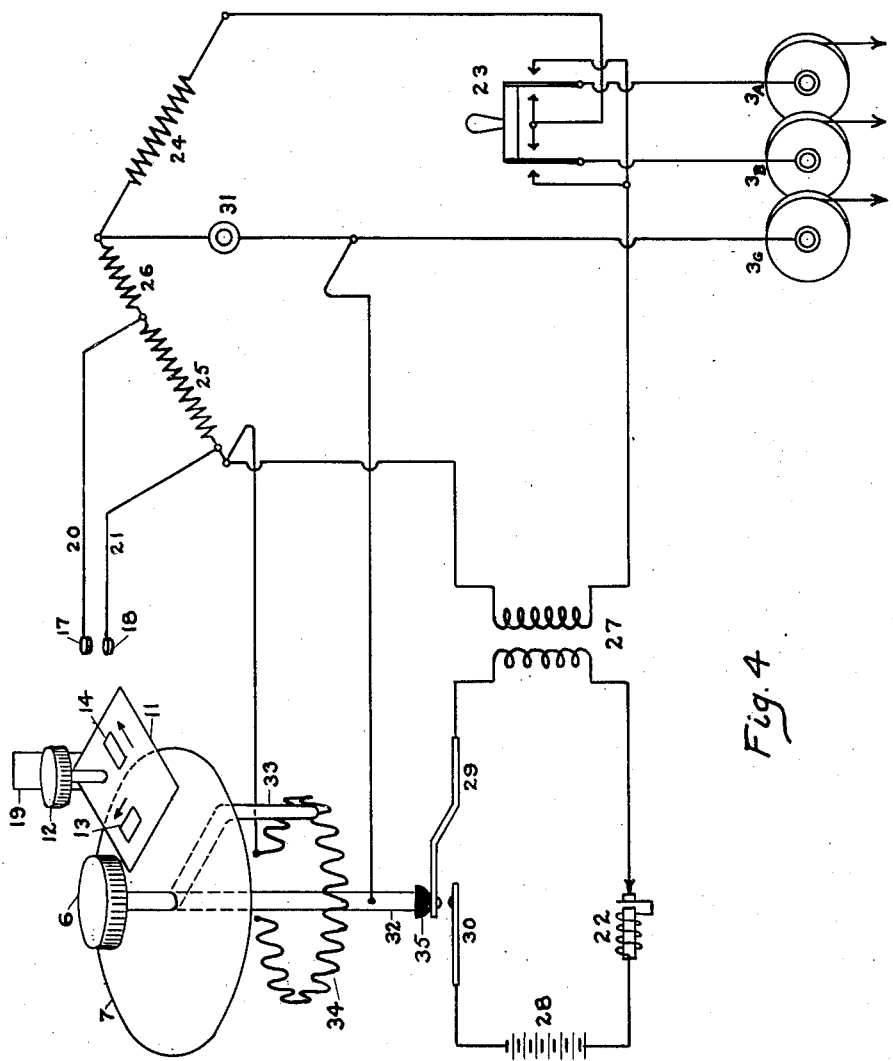
Fig. 4 is a schematic representation of the apparatus comprising the set and the connecting wires.

Certain novel features in the rheostat assembly will be apparent upon examination of Fig. 4. The rheostat assembly consists of shaft 32 with its knob 6, contact spring 33, dial 7, and rheostat form 34. The shaft can be both rotated and longitudinally depressed, the former for the usual purpose of moving contact spring 33 over the resistance form 34 to vary the resistance, and the latter for the purpose of closing a pair of contacts 29 and 30 in the battery circuit. The upper battery spring switch member 29 is so formed that it will normally exert such a force upon the rheostat shaft as to insure an open circuit for the battery when there is no pressure being exerted upon the knob 6. Upon the knob being pressed down, the button 35 on the end of the shaft forces the upper battery switch spring into contact with the lower, thus effecting closure of the battery circuit as a preliminary to variation of the rheostat in establishing a condition of bridge balance.

Fig. 1 shows the assembly of the three reels $3_A$, $3_B$, and $3_G$, on shaft 36, and the fastening of the latter in the box. The construction and mounting of the reels are shown in detail in Fig. 3. The reels are preferably wound with flexible stranded wire, well insulated, and the free end of each of the wires projects through a slot 37 in a wire guide strip 38 and is terminated in a connecting clip, as is shown in Fig. 1.

Figure 3:
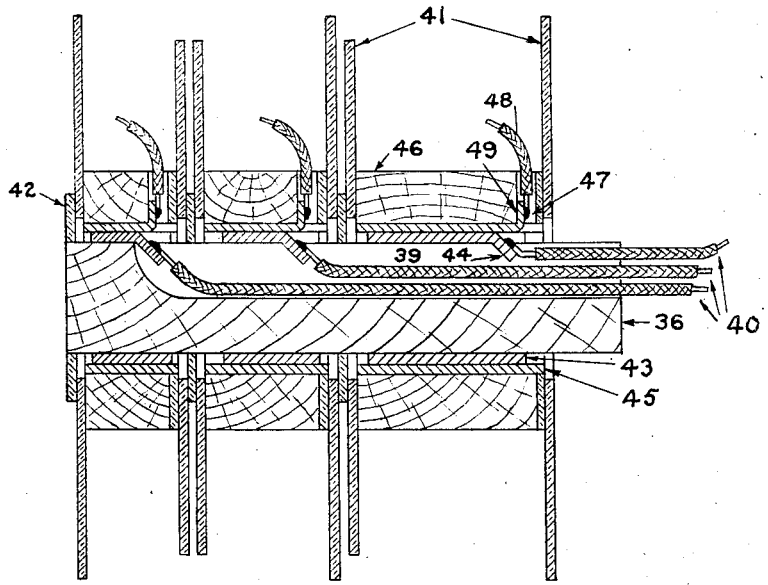
Fig. 3 is a longitudinal section of the reel assembly.

Referring to Fig. 3, the shaft 36 of the reel assembly is grooved at 39 for the purpose of leading in to the respective reels the wires 40 which connect them to the apparatus of the test set. The shaft is made of non-conducting material, for example, wood, and may be supported in the side wall of box 1 and the partition which forms the other wall of compartment 3. The reels terminate in brass discs 41, and are separated from each other and from the supports by fibre washers 42. Longitudinally spaced upon the shaft 36 are sleeves 43, of electrically conducting material such as brass each of which is provided with a tongue 44 projecting into groove 39. The wire conductors 40 are fastened one to each tongue. Upon each sleeve 43 is mounted another sleeve 45, which forms part of a wire reel. The reels turn freely upon the brass sleeves on the shaft, which may be given a thin coating of graphite or petroleum jelly for the purpose. A wooden spool 46, provided with groove 47, is arranged on the outer sleeve and a conductor 48 is fastened to a tongue 49 on sleeve 45 projecting into groove 47. The brass sleeves on the shaft are glued or otherwise permanently fastened in place. It will be apparent from the construction described that each reel is electrically insulated from the others and that contact to each wire is provided for through contacting sleeves on the shaft.

The method of using the set and its manner of operation will appear from examination of the schematic representation shown in Fig. 4. The ground under test G and two auxiliary grounds A and B are connected to the test unit by means of the wires on reels $3_G$, $3_A$, and $3_B$, respectively. The large knob 6 in the center of panel 2 is then pressed down and turned until a balance is reached as indicated by the sound in receiver 31 becoming a minimum. The resistance of the ground under test will be the figure shown in the window between the two knobs. If a balance cannot be obtained by turning the knob one complete turn, the smaller knob 12 is then given a quarter turn in the direction shown by arrow 15. The center knob 6 is then again pressed down and turned until a balance is reached. The resistance will be that shown in the window. It will be noted that the readings on the scale 9 now exposed are ten times as large as the readings on the scale 8 exposed before knob 12 was turned. This is because rotation of knob 12 has effected the short-circuiting of resistance 25, of 4500 ohms, and accordingly changed the ratio arms of the bridge from the values 5000 ohms and 5000 ohms, as indicated, to the values 500 ohms and 5000 ohms. The readings on the exposed scale 9, which are direct readings of the resistance of the ground under test, bear the same relation to the effective resistance of rheostat 5 as 5000 bears to 500,— this being in accordance with the proportionality which exists among the four arms of a bridge when it is balanced.

The shutter device with its shunting switch therefore makes possible the automatic variation of the ratio of the arms of the bridge, and the direct reading of the resistance of the ground under test, whether the ratio arms be equal or bear the relation of multiples, one of the other. Thus the test set of our invention obviates the need of making any calculations whatever, even the simple one of multiplying the rheostat reading by ten, and so simplifies the method of measuring ground resistance by means of the high resistance bridge as to eliminate the possibility of errors in recording the resistance of the ground under test due to ignorance or carelessness.

To enable the accuracy of the reading to be checked, the switch 23 operated by the lever in the right hand corner of panel 2 is used to reverse the connections of auxiliary grounds A and B. The operations described above are then repeated, and a second direct reading of the resistance of the ground under test thus obtained. The lower of the two values is taken as the correct resistance of the ground under test.

What we claim is:

1. In a testing system, a circuit including a fixed resistance and a variable resistance, rotatable means for varying the amount of said second resistance effectively in circuit, a dial mounted on said rotatable means marked in two ranges of resistance values, means cooperating with said dial to selectively expose one or the other range of values, and means controlled by said cooperating means to effectively remove said fixed resistance from the circuit.

2. In a balanced bridge arrangement, a pair of ratio arms including fixed resistances, means to short-circuit a portion of the resistance of one arm, a variable resistance in a third arm, a dial for said variable resistance marked in two sets of values, and means cooperating with said dial to selectively expose one set of values while concealing the other, said last mentioned means including means to control said short-circuiting means.

3. In a test set, a pair of separated contacts, a dial, a shutter device for said dial, means to change the relative position of the shutter device and the dial, and switching means carried by said shutter device adapted to connect said contacts in one position of the device.

4. In a test set, a pair of conductor terminals normally unconnected, a dial bearing two rows of indices, a shutter device overlying said dial and comprising two openings, one of which registers with one row of indices, means to rotate said shutter device to bring the other opening into registration with the second row of indices, and a switch arm on said shutter device operable upon rotation of the device to connect said conductor terminals.

5. In a portable set, a panel, a variable rheostat mounted on the panel having a rotatable shaft extending through the panel and terminating in a manually operable knob, a dial for the rheostat mounted in back of the panel in fixed relation to the shaft and provided with a plurality of sets of indices, said panel having an opening through which the indices are visible, a shutter plate mounted between the panel and the dial and provided with a plurality of openings each of which may be brought into registration with the opening in the panel and with one set of indices, and a switch arm mounted on the shutter plate.

6. In a portable set, an instrument panel, a variable rheostat mounted on said panel having a rotatable and depressible shaft extending through the panel and terminating in a manually operable knob, a variable contact for said rheostat mounted on the shaft, and a button on the other end of the shaft, a pair of separated spring contacts one of which normally exerts pressure on said shaft against the button, a dial for the rheostat mounted on said shaft and marked with two rows of figures, said panel being provided with an opening through which the figures are visible, a shutter mounted on said panel overlying the dial and provided with two openings each of which may be brought into registration with the opening in the panel and with one of the rows of figures on the dial, rotating means for the shutter including a manually operable knob extending through the panel, a pair of separated terminals mounted on the panel, and a switch arm mounted on the shutter adapted to bridge said terminals in one position of the shutter.

In testimony whereof, we affix our signatures.

EVERETT V. MOTT.
LEWIS H. ROVERE.
DAVIDGE H. ROWLAND.